Figure 1:
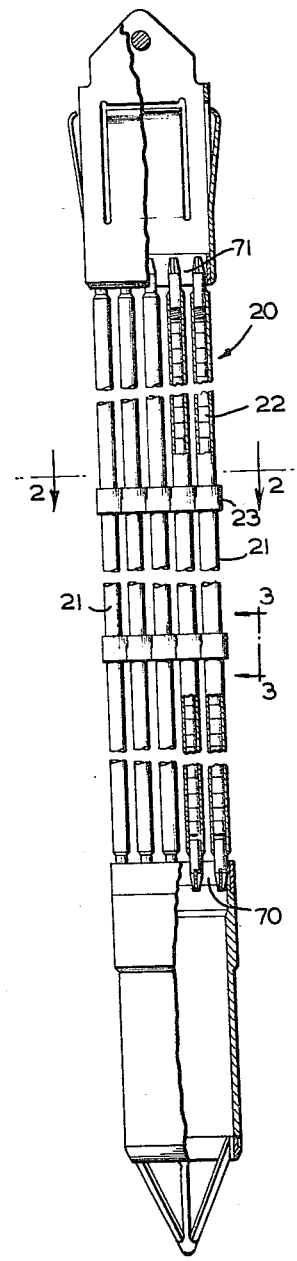

Dec. 11, 1962  E. L. CURRIER, JR., ET AL  3,068,163
METHOD AND MEANS FOR SUPPORTING REACTOR FUEL
CONTAINERS IN AN ASSEMBLY
Filed Aug. 26, 1958  4 Sheets-Sheet 1

INVENTORS
EDWIN L. CURRIER, JR.
JOHN H. NICKLAS
BY CHADWICK A. COOMBS

ATTORNEY

Dec. 11, 1962 E. L. CURRIER, JR., ET AL 3,068,163
METHOD AND MEANS FOR SUPPORTING REACTOR FUEL
CONTAINERS IN AN ASSEMBLY
Filed Aug. 26, 1958 4 Sheets-Sheet 2

INVENTORS
EDWIN L. CURRIER, JR.
JOHN H. NICKLAS
BY CHADWICK A. COOMBS

ATTORNEY

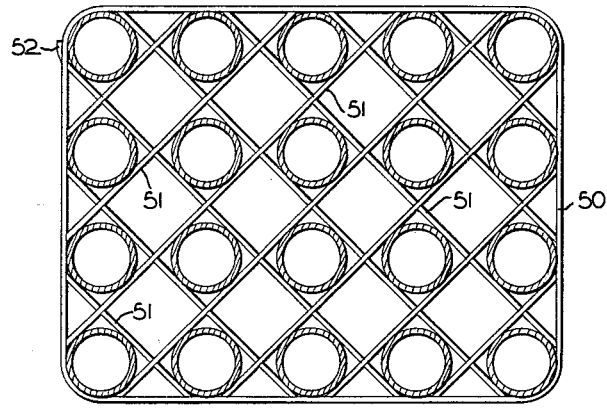
FIG. 8.
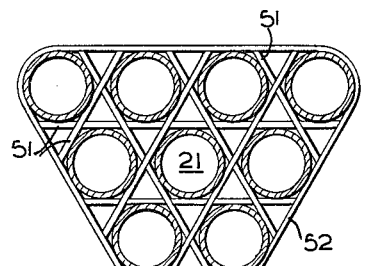
FIG. 9.
FIG. 10.
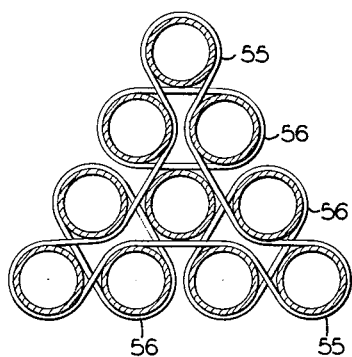
INVENTORS
EDWIN L. CURRIER, JR.
JOHN H. NICKLAS
BY CHADWICK A. COOMBS
ATTORNEY Dec. 11, 1962 E. L. CURRIER, JR., ET AL 3,068,163
METHOD AND MEANS FOR SUPPORTING REACTOR FUEL
CONTAINERS IN AN ASSEMBLY
Filed Aug. 26, 1958 4 Sheets-Sheet 4

INVENTORS
EDWIN L. CURRIER, JR.
JOHN H. NICKLAS
BY CHADWICK A. COOMBS

ATTORNEY

United States Patent Office 3,068,163
Patented Dec. 11, 1962

3,068,163
METHOD AND MEANS FOR SUPPORTING REACTOR FUEL CONTAINERS IN AN ASSEMBLY
Edwin L. Currier, Jr., Silver Spring, and John H. Nicklas, Hyattsville, Md., and Chadwick A. Coombs, Washington, D.C., assignors, by mesne assignments, to the United States of America as represented by the United States Atomic Energy Commission
Filed Aug. 26, 1958, Ser. No. 757,223
7 Claims. (Cl. 204—193.2)

The present invention relates to nuclear reactor fuel elements and, more particularly, to improved methods and means for supporting fuel containing tubes in an assembly.

The present invention is directed to improvements in the fuel container or pin supports disclosed in co-pending application Ser. No. 757,381, filed August 20, 1958, entitled Fuel Element for Nuclear Reactor by James J. Dickson, the disclosure of which is incorporated herein by reference.

In the fuel element assembly of the above-referenced application, jigs and other holding and aligning equipment are required. The present invention eliminates the necessity for much of this equipment but maintains the same weight relation, rigidity, and reduction of poisoning material standards pointed out in the referenced application.

The various embodiments of the present invention require no modification of the reactor shown in the above-mentioned application and the operating characteristics disclosed there apply also to the improvements of the present invention.

Therefore, it is a general object of the present invention to provide an improved fuel element assembly for a nuclear reactor.

It is a further object of the present invention to provide a simple, inexpensive, rigid support for the fuel containers of a fuel element.

A still further object of the present invention is to provide an improved support for the fuel containing pins of a nuclear reactor in which one or more bands are utilized to provide lateral support at a plurality of angles to the vertical plane of the fuel element assembly.

Another object of the present invention is to provide a lateral support band thereby rigidly linking the fuel containers intermediate the ends of said fuel containers.

Another object of the present invention is to provide a lateral support member for a fuel element containing a plurality of fuel pins which support member also functions as an assembly jig.

Another object of the present invention is to provide a fuel container supporting means which provides lateral support between a plurality of fuel containers which supporting means may be preassembled thereby functioning as an alignment and spacing assembly-jig.

A still further object of the present invention is to provide a fuel container supporting means which provides a support in a plurality of lateral directions to the longitudinal axis of the fuel containers which supporting means is preassembled to form an assembly jig thereby eliminating side plates and providing a plurality of geometrical arrangements.

Figure 2:
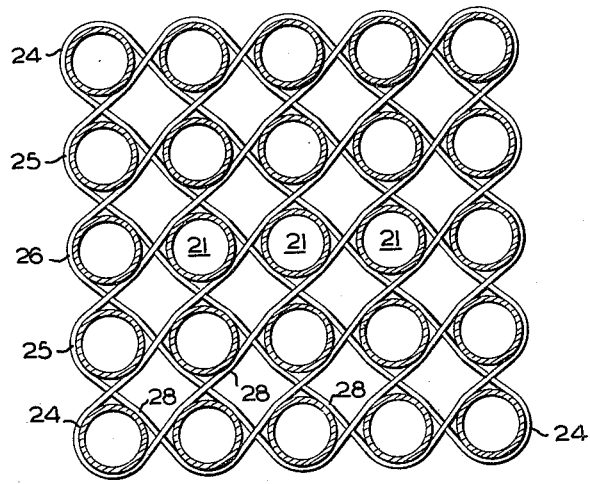
Figure 3:
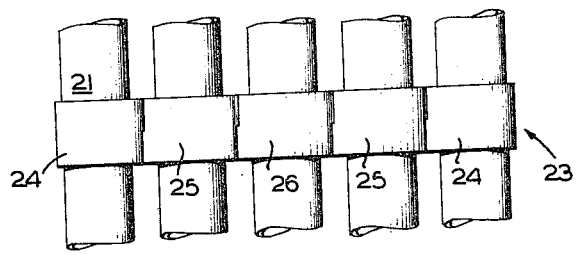
Figure 4:
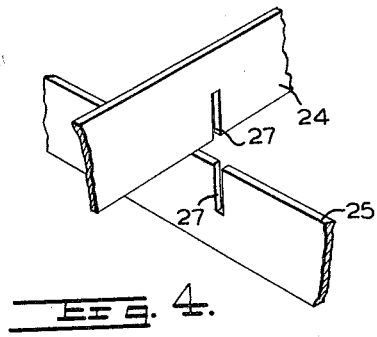

These and other objects of the present invention will become more apparent from the following detailed description including drawings hereby made a part of the specification, in which:

FIG. 1 is a partially sectioned view of a fuel element utilizing the support means of the present invention.
FIG. 2 is a sectional view along line 2—2 of FIG. 1.
FIG. 3 is a side view of FIG. 1 at 3—3.
FIG. 4 is a detail view of the band interlocking means of FIG. 2.

Figure 5:
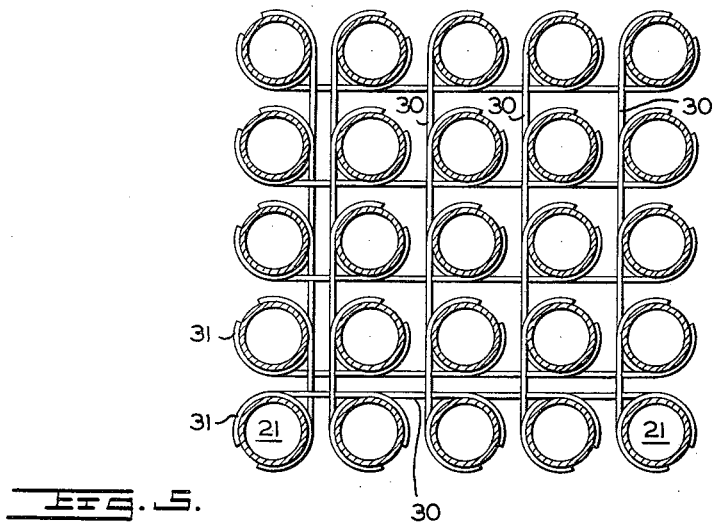
Figure 6:
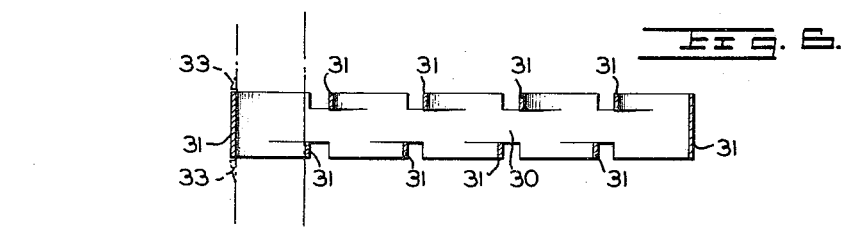
Figure 7:
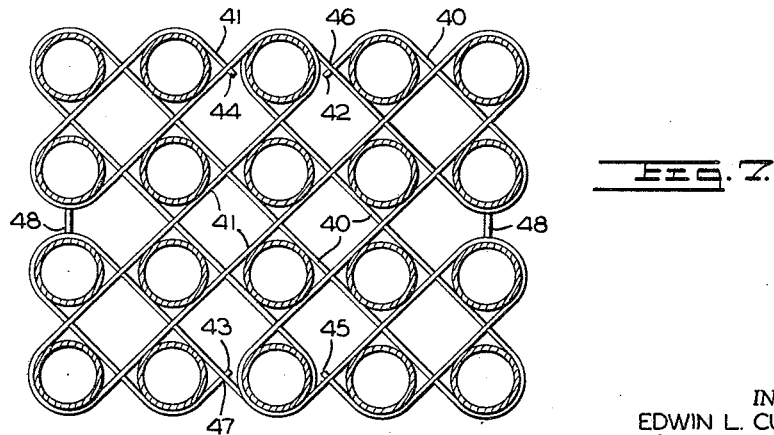
Figure 11:
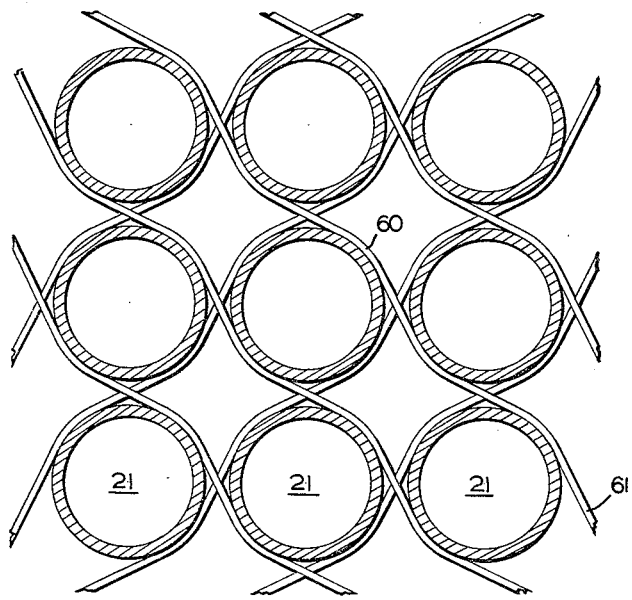
Figure 12:
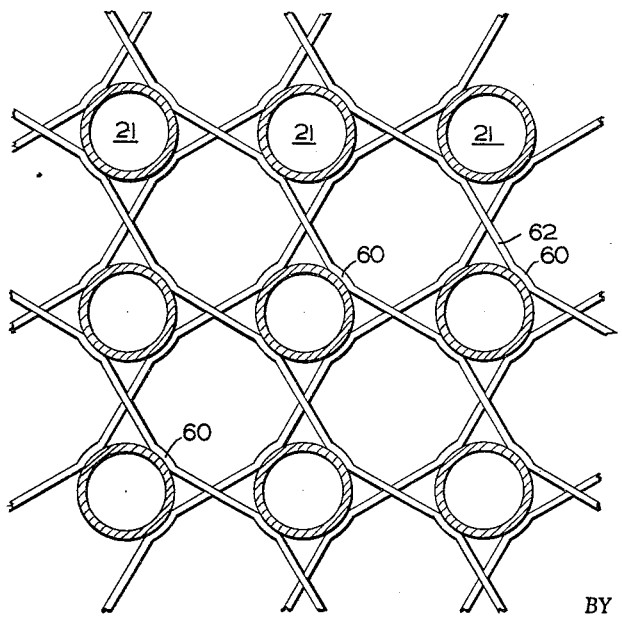

FIG. 5 is a sectional view of a second embodiment of the present invention.
FIG. 6 is a side view, partly in section, of one of the bands utilized in the embodiment of FIG. 5.
FIG. 7 is a sectional view of a third embodiment of the present invention.
FIG. 8 is a sectional view of a fourth embodiment of the present invention.
FIG. 9 is a sectional view of a different geometric arrangement of the fourth embodiment.
FIG. 10 is a sectional view of a different geometric arrangement of first embodiment of the present invention.
FIG. 11 is a sectional view of modification for the spacing of tubes.
FIG. 12 is a second modification for the spacing of tubes.

Referring now to the drawings, FIG. 1 is a partially sectioned view of a nuclear reactor fuel element showing one of the holding means of the present invention. Specifically, the fuel element assembly 20 consists of a plurality, twenty-five in the example shown, of fuel containing pins 21 in which the fuel pellets 22 are contained. As has been pointed out in the above-referenced co-pending application, the prior art fuel elements utilizing tubular fuel containers relied upon an outer casing over the entire length and spiral spacers to prevent vibration or lateral motion of the pins or tubes 21. This co-pending application also discloses a spacing and support grid arrangement in the same relative location as the support band 23 of the present invention. However, the support grid shown in that application required a plurality of separate welding and assembly steps which materially increased the time and cost of fabricating a fuel element of the type shown.

The support members 23 of the present invention are an improvement in that they may be preassembled thereby eliminating an assembly fixture. They may be welded or otherwise integrally connected into a support assembly in an ordinary manufacturing facility thereby eliminating a plurality of welding steps in the presence of radioactive material as required by the support members of the co-pending application. Also, it is not essential in the various embodiments of the present invention that the support member 23 be welded to the various pins 21, since all the various bands may be fabricated of resilient material which would firmly hold the pins 21 in the proper spaced relation without slipping. Since the primary purpose of the support members is to reduce the poisoning material in the core region of a reactor and at the same time maintain the proper spaced relation, the bands of this invention are preferably fabricated from sheet metal and formed into the proper band arrangement depending upon the particular embodiment.

Specifically, in FIG. 2 three types of endless bands approximately one-half inch wide are utilized. Two bands 24, one tube in width, two bands 25 approximately three tubes wide and one band 26 about five tubes wide are utilized. The various bands, 24, 25 and 26 preferably have interlocking slots 27 as shown in FIG. 4 so that the five bands make an assembly 23 as shown in FIG. 3. Preferably, this assembly is welded or otherwise securely held together by welding, brazing the interlocking edges of slots 27. However, it is apparent from FIG. 2 that if upon assembly with the pins 21 a slight bowing or displacement of the bands takes place, as at 28, the interlocking slots will be slightly distorted so that the various bands will be firmly held together. In this manner, by providing a close fit in the interlocking slots, the assembled member 23 will be held together by the close fit and upon insertion of the tubes all bands will be locked into permanent spacing assembly. Thus, it is not essential to perform any welding or brazing steps on the bands or to weld or braze the bands to the pins 21.

FIG. 5 illustrates another embodiment of the present invention in which straight bands are utilized having curved tabs 31 spaced along their length. A clearer picture of one of the straight bands is shown in FIG. 6. The straight bands may be interlocked by utilizing the slot arrangement illustrated in FIG. 4 or they may be interconnected by welding or brazing with or without the slot arrangement.

In this arrangement of straight bands and curved tabs it is generally desirable to weld the pins 21 to the curved tabs 31, although it would not be essential if the tabs 31 have a resilient property and the surface area of the curved tabs in contact with the pin 21 is sufficient, i.e., about one-half inch, to prevent slipping of the entire assembly. Since movement of the entire assembly of straight bands 30 would only be along the axis of the pins 21, other methods of preventing movement without welding or brazing would be obvious, such as providing shoulders 33 to maintain the proper position.

It should be expressly noted that in both of the embodiments described above it may be desirable to locate the various bands at different points along the length of the pins 21 without preassembling the bands into a unitary member. However, such an arrangement would lack some of the advantages of utilizing the unitary member as an assembling unit. It would, however, have the advantage that no slots 27 would be required.

The embodiment shown in FIG. 7 is composed of two curved bands 40 and 41, the first starting at point 42 and ending at point 43, and the second starting at point 44 and ending at point 45. The interlocking feature of FIG. 4 may be utilized in this embodiment not only between the two bands but also between various segments of the same band. Thus, points 46 and 47, for example would be points where the band 40 interlocked with itself. The bands in FIG. 7 have a plurality of straight portions which are at right angles to the straight portions of the other bands. However, these straight portions are at acute angles to the outside plane of the tube bundle in the same manner as in the embodiment of FIG. 2. Spacers 48 may be included to provide additional support.

The embodiment of FIG. 8 is composed of an outside endless band 50 with a plurality of interlocking cross bands 51 which may be welded, brazed or interlocked with the outside band 50 as indicated at 52.

FIG. 9 shows a different geometric assembly utilizing the band arrangement of FIG. 8. FIG. 10 shows a different geometric assembly of the endless band arrangement of FIG. 2 utilizing two types of bands 55 and 56. Thus, it is apparent that the various embodiments shown in FIGS. 2, 5, 7 and 8 can be modified to provide for triangular, hexagonal, square, rectangular or other geometric assemblies. Further, from FIGS. 11 and 12 it can be seen that a close (FIG. 11) or distant (FIG. 12) spacing between fuel pins can be utilized in the various embodiments by providing a curved portion 60 concentric with the outside surface of the tube 21 in the bands 61 (FIG. 11). If a larger distance between tubes 21 is required, then, as seen in FIG. 12, the concentric curved portions 60 will be spaced from each other by straight portions 62.

From the above description of the various embodiments of the present invention it is apparent that the present invention provides a light-weight, inexpensive, lateral support member which may function as an assembling unit.

Referring again to FIG. 1, for example, the bands 24, 25 and 26 are assembled into a unit, preferably by using the interlocking feature, so that an assembly 23 as shown in FIG. 3 is obtained. The individual pins 21 are then inserted into the appropriate opening to form a bundle of fuel containing tubes supported in spaced relation by one support assembly 23 at a point about one-third the distance from the bottom of the tube bundle. A second assembly 23 is then prepared and is forced downwardly over all of the tubes of the bundle until it is equal spaced from the top of the bundle and the other assembly 23. Only two such assemblies 23 are required to give ample lateral support and in reactors utilizing low coolant flow rates only one at the middle of the bundle would suffice. The grid plates 70 and 71 are then placed on the bundle and welded in place. The remaining members of the fuel element assembly may then be added in any order and manner most desirable.

Other methods of assembly as pointed out above, i.e., not preassembling the various bands of FIG. 1 for example, having different levels of individual bands along the length instead of discrete band assemblies, assembling the lower grid 70 and the fuel pins first and then assembling the band assemblies and inserting all the pins through both band assemblies, are apparent from the above description.

Although various embodiments of the present invention have been described, other arrangements and spacing and supporting means will be apparent to those skilled in the art. Therefore, the present invention is not limited to the specific details of the particular embodiments described, the scope of the invention being limited only by the appended claims.

What is claimed is:

1. A nuclear reactor fuel element assembly comprising a plurality of fuel containing tubes forming a bundle, said tubes being closed and spaced from each other at each end of said bundle, grid means at opposite ends, respectively, of said fuel element assembly interconnecting the ends of said tubes for supporting said tubes in spaced relation, and means intermediate the ends of said tubes for holding said tubes against lateral displacement, the improvement of said last named means including a plurality of interconnected bands wherein each of said bands is connected to a plurality of fuel containing tubes and at least one of said bands is endless.

2. A nuclear reactor fuel element assembly comprising a plurality of fuel containing tubes forming a bundle, said tubes being closed and spaced from each other at each end of said bundle, grid means at opposite ends, respectively, of said fuel element assembly interconnecting the ends of said tubes for supporting said tubes in spaced relation, and means intermediate the ends of said tubes for holding said tubes against lateral displacement, the improvement of said last named means including a plurality of interconnected bands wherein each of said bands is connected to a plurality of fuel containing tubes and each of said bands has a plurality of curved portions, each of said curved portions contacting a portion of the outer surface of one of said tubes.

3. A nuclear reactor fuel element assembly comprising a plurality of fuel containing tubes forming a bundle, said tubes being closed and spaced from each other at each end of said bundle, grid means at opposite ends, respectively, of said fuel element assembly interconnecting the ends of said tubes for supporting said tubes in spaced relation, and means intermediate the ends of said tubes for holding said tubes against lateral displacement, the improvement of said last named means including a plurality of interconnected bands wherein each of said bands is connected to a plurality of fuel containing tubes, the longitudinal axis of a portion of said bands is at right angles to the longitudinal axis of the other portion of said bands, and each of said tubes is engaged by at least one curved section of one band of each portion.

4. A nuclear reactor fuel element assembly comprising a plurality of fuel containing tubes forming a bundle, said tubes being closed and spaced from each other at each end of said bundle, grid means at opposite ends, respectively, of said fuel element assembly interconnecting the ends of said tubes for supporting said tubes in spaced relation, and means intermediate the ends of said tubes for holding said tubes against lateral displacement, the improvement of said last named means including a plurality of interconnected bands wherein each of said bands is connected to a plurality of fuel containing tubes and said plurality of interconnecting bands includes a plurality of endless bands having longitudinal axes at right angles to each other.

5. A nuclear reactor fuel element assembly comprising a plurality of fuel containing tubes forming a bundle, said tubes being closed and spaced from each other at each end of said bundle, grid means at opposite ends, respectively, of said fuel element assembly interconnecting the ends of said tubes for supporting said tubes in spaced relation, and means intermediate the ends of said tubes for holding said tubes against lateral displacement, the improvement of said last named means including a plurality of interconnected bands wherein each of said bands is connected to a plurality of fuel containing tubes and said bands are straight bands having a plurality of curved tabs along each of their lengths.

6. A nuclear reactor fuel element assembly comprising a plurality of fuel containing tubes forming a bundle, said tubes being closed and spaced from each other at each end of said bundle, grid means at opposite ends, respectively, of said fuel element assembly interconnecting the ends of said tubes for supporting said tubes in spaced relation, and means intermediate the ends of said tubes for holding said tubes against lateral displacement, the improvement of said last named means including a plurality of interconnected bands wherein each of said bands is connected to a plurality of fuel containing tubes, said bands are straight and have a plurality of curved tabs along each of their lengths, and each tube in said bundle is engaged by two of said tabs.

7. A nuclear reactor fuel element assembly comprising a plurality of fuel containing tubes forming a bundle, said tubes being closed and spaced from each other at each end of said bundle, grid means at opposite ends, respectively, of said fuel element assembly interconnecting the ends of said tubes for supporting said tubes in spaced relation, and means intermediate the ends of said tubes for holding said tubes against lateral displacement, the improvement of said last named means including a plurality of interconnected bands wherein each of said bands is connected to a plurality of fuel containing tubes, said bands are straight and have a plurality of curved tabs along each of their lengths, and each of said tubes in said bundle is engaged by two of said tabs, said two tabs being associated with perpendicular bands.

References Cited in the file of this patent

UNITED STATES PATENTS

| | | |
|---|---|---|
| 1,748,140 | Muhleisen | Feb. 25, 1930 |
| 1,869,236 | Bauman | July 26, 1932 |
| 1,946,234 | Price | Feb. 6, 1934 |
| 2,229,344 | Schneider | Jan. 21, 1941 |
| 2,735,658 | Cook | Feb. 21, 1956 |
| 2,848,404 | Treshow | Aug. 19, 1958 |
| 2,898,280 | Schultz | Aug. 4, 1959 |

FOREIGN PATENTS

| | | |
|---|---|---|
| 972,720 | France | Feb. 2, 1951 |

OTHER REFERENCES

GER–1301, "A Design Description of the Dresden Nuclear Power Station," November 1956, pp. 12 and 13.

TID–7529 (Part I), Reactor Heat Transfer, Conf. of 1956, pp. 248–261 (particularly page 254).